(12) United States Patent
Vincent et al.

(10) Patent No.: US 9,104,914 B1
(45) Date of Patent: Aug. 11, 2015

(54) OBJECT DETECTION WITH FALSE POSITIVE FILTERING

(71) Applicant: Google Inc., Mountain View, CA (US)

(72) Inventors: Luc Vincent, Palo Alto, CA (US); Bo Wu, Mountain View, CA (US); Ahmad Abdulkader, San Jose, CA (US); Marco Zennaro, San Francisco, CA (US); Alessandro Bissacco, Los Angeles, CA (US); Hartwig Adam, Marina Del Rey, CA (US); Kong Man Cheung, San Francisco, CA (US); Hartmut Neven, Mailbu, CA (US); Andrea Lynn Frome, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/278,450

(22) Filed: May 15, 2014

Related U.S. Application Data

(63) Continuation of application No. 13/614,822, filed on Sep. 13, 2012, now Pat. No. 8,761,446, which is a continuation of application No. 12/453,432, filed on May 11, 2009, now Pat. No. 8,345,921.

(60) Provisional application No. 61/158,958, filed on Mar. 10, 2009.

(51) Int. Cl.
*G06K 9/00* (2006.01)

(52) U.S. Cl.
CPC ........ *G06K 9/00624* (2013.01); *G06K 9/00228* (2013.01); *G06K 9/00791* (2013.01)

(58) Field of Classification Search
CPC .. G06K 2209/15; G06K 9/00221; G06K 9/72
USPC .......................................................... 382/103
See application file for complete search history.

(56) References Cited

U.S. PATENT DOCUMENTS

| 6,421,463 | B1 | 7/2002 | Poggio et al. |
| 6,990,239 | B1 | 1/2006 | Nelson |
| 8,098,904 | B2 | 1/2012 | Ioffe et al. |
| 8,345,921 | B1 | 1/2013 | Frome et al. |
| 2007/0210937 | A1 | 9/2007 | Smith et al. |
| 2007/0237364 | A1 | 10/2007 | Song et al. |
| 2008/0002914 | A1 | 1/2008 | Vincent et al. |

OTHER PUBLICATIONS

Bengio, Y., et al., "Greedy Layer-Wise Training of Deep Networks", Advances in Neural Information Processing Systems, MIT Press, Cambridge,MA, 2007, 8 pages.

(Continued)

*Primary Examiner* — Tom Y Lu
(74) *Attorney, Agent, or Firm* — Lerner, David, Littenberg, Krumholz & Mentlik, LLP (57) ABSTRACT

Embodiments of this invention relate to detecting and blurring images. In an embodiment, a system detects objects in a photographic image. The system includes an object detector module configured to detect regions of the photographic image that include objects of a particular type at least based on the content of the photographic image. The system further includes a false positive detector module configured to determine whether each region detected by the object detector module includes an object of the particular type at least based on information about the context in which the photographic image was taken.

17 Claims, 4 Drawing Sheets

(56) References Cited

OTHER PUBLICATIONS

Dlagnekov, L., et al., "Recognizing Cars", accessed at http://cseweb.ucsd.edu/classes/fa05/cse252c/dlagnekov.sub.—belongie.pdf, 2005, accessed on Jan. 14, 2010, 8 pages.

Dlagnekov, L., "Video-Based Car Surveillance: License Plate, Make, and Model Recognition", USCD Master's Thesis, 2005, 15 pages.

Hjelmas, E, and Low, B.K., "Face Detection: A Survey", Computer Vision and Image Understanding, Academic Press, vol. 83., No. 3, Sep. 2001, pp. 236-274.

Hoiem, D., et al., "Putting Objects in Perspective" Proceedings of CVPR 2, New York, New York, Jun. 2006, 13 pages.

Huang, C., et al., "High Performance Rotation Invariant Multiview Face Detection" IEEE Transactions on Pattern Analysis and Machine Intelligence, IEEE Computer Society, Washington D.C., vol. 29, No. 4, Apr. 2007, 16 pages.

Terrillon, J.C., et al., "Comparative Performance of Different Skin Chrominance Models and Chrominance Spaces for the Automatic Detection of Human Faces in Color Images", Proc. IEEE Automatic Face and Gesture Reconition, IEEE Computer Society,Washington D.C., Mar. 2000, pp. 54-61.

Jones, M.J., and Rehg, J.M., "Statistical Color Models with Application to Skin Detection", IEEE Conference of Computer Vision and Pattern Recognition, vol. 1, Fort Collins, CO, Jun. 1999, pp. 274-280.

Kruppa, H., et al., "Fast and Robust Face Finding Via Local Context", Joint IEEE International Workshop on VS-PETS, 2003, 8 pages.

Lengelle, R., and Den, T., "Training MLPS Layer by Layer Using an Objective Function for Internal Representations", Neural Networks, vol. 9, No. 1, Elsevier Science Ltd., Oxford, UK, 1996, pp. 83-97.

Porikli, F., and Kocak, T., "Robust License Plate Detection Using Covariance Descriptor in a Neural Network Framework", AVSS,IEEE Computer Society, Washington D.C., 2006, 8 pages.

Rowley, H.A., et al., "Neural Network-Based Face Detection", IEEE Transactions on Pattern Analysis and Machine Intelligence, vol. 20, No. 1, Jan. 1998, pp. 23-38.

Schneiderman, H., and Kanade, T., "A Statistical Method for 3D Object Detection Applied to Faces and Cars", CVPR, vol. 1, Hilton Head, SC, Jun. 2000, pp. 746-751.

Vincent, L., "Taking Online Maps Down to Street Level", IEEE Computer 40, IEEE Computer Society Press, Los Alamitos, CA, Dec. 2007, 3 pages.

Viola, P., and Jones, M., "Rapid Object Detection Using a Boosted Cascade of Simple Features", CVPR, 2001, 13 pages.

"Google Maps with StreetView", http://www.google.com/help/maps/streetview/, Feb. 2009, last accessed Jan. 15, 2010, 1 page.

Villaverde, I., et al., "Morphological Neural Networks for Localization and Mapping", IEEE International Conference on Computational Intelligence for Measurement Systems and Applications, La Coruna, Spain, Jul. 2006, pp. 9-14.

Namatame, A., and Tsukamoto, Y., "Composite Neural Network Models & Their Application", Proceedings of 1993 International Joint Conference on Neural Networks, 1993, pp. 738-741.

"Artificial Neural Network", Wikipedia.com, accessed at http://en.wikipedia.org/wiki/Artificial.sub.--neural.sub.--network, Mar. 4, 2009, 17 pages.

"Welcome to EveryScape", Internet Archive, Apr. 2008, http://www.everyscape.com, 1 page.

"MapJack—Help," http://www.mapjack.com/Help.html, last accessed Jan. 15, 2010, 9 pages.

Kang, Kevin, "Daum beats Google Maps and StreetView to the chase," CNET Asia, Nov. 18, 2008, 3 pages.

OBJECT DETECTION WITH FALSE POSITIVE FILTERING

CROSS REFERENCE

The present application is a continuation of U.S. patent application Ser. No. 13/614,822, filed on Sep. 13, 2012, which is a continuation of U.S. patent application Ser. No. 12/453,432, filed on May 11, 2009, which claims the benefit of U.S. Provisional Application No. 61/158,958, filed Mar. 10, 2009, the disclosures of which are incorporated herein by reference.

BACKGROUND

1. Field of the Invention

Embodiments of this invention are generally related to image recognition.

2. Related Art

Recent advances in computer networking and processing make images easily accessible. However, public access of images, especially images containing human faces, raises privacy concerns. In one example, the STREETVIEW service, available from Google, Inc., provides street-level panoramic photographs in major metropolitan areas. The photographs include images of people's faces and license plates. Putting un-obscured images of faces and license plates online may raise privacy concerns.

To protect privacy, some previous efforts have attempted to obscure objects, such as faces, in images. Regions in images that include faces can be detected and then obscured. These face detection algorithms can be tuned for high recall to increase the likelihood that every face is detected. However, when these algorithms are tuned for high-recall, the number of false positives (regions that do not actually include a face) may increase.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements

DETAILED DESCRIPTION

To protect privacy in embodiments of the present invention, objects, such as faces and license plates, are detected and blurred. In embodiments, a face may be detected by a face detection algorithm tuned for a high recall to detect a large number of image regions. The image regions are again processed to check for false positives. When checking for false positives, information about the context of the images may be used. Finally, the image regions that are not recognized as false positive are blurred.

In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
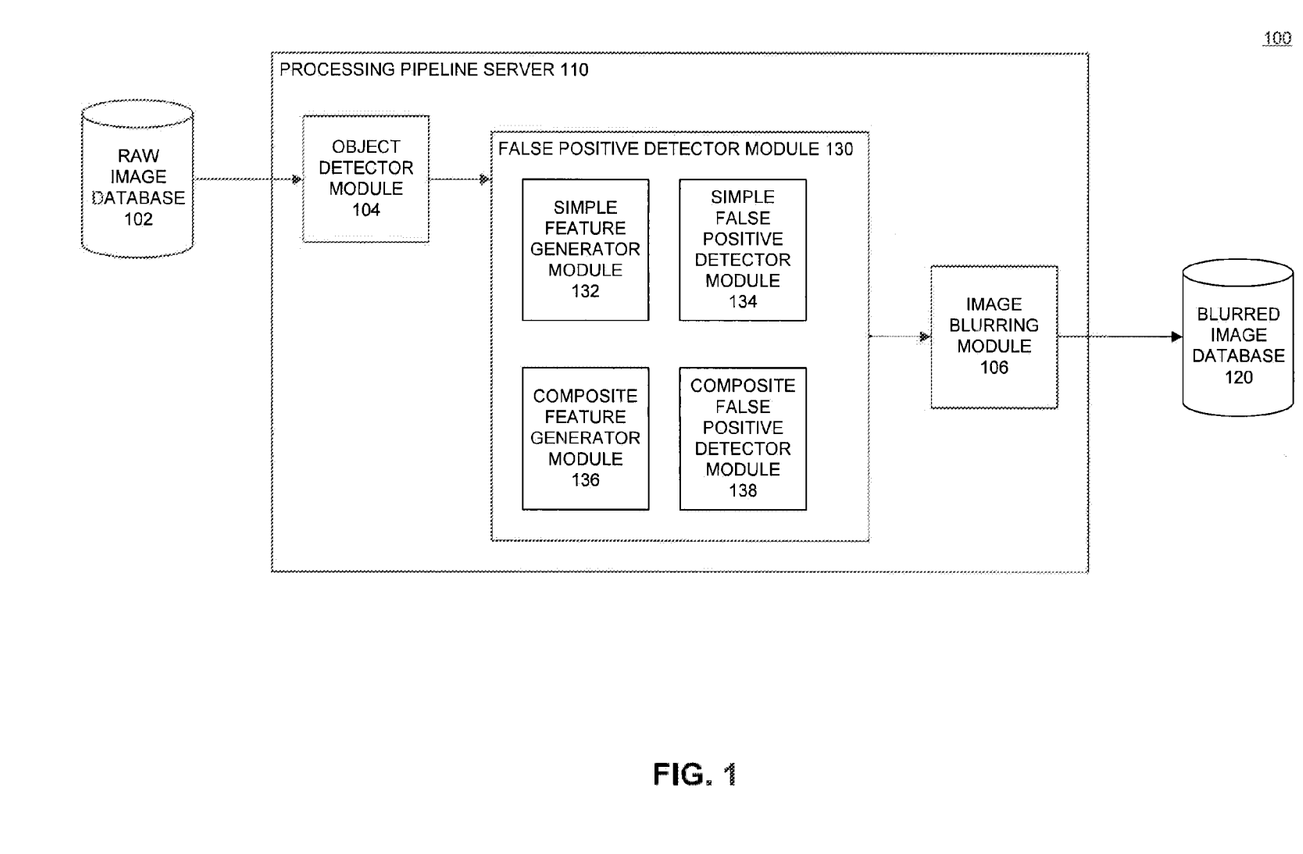
FIG. 1 is a diagram illustrating a system for detecting and blurring objects, such as faces and license plates, in images, according to an embodiment of the present invention.

FIG. 1 is a diagram illustrating a system 100 for detecting and blurring objects, such as faces and license plates, in images, according to an embodiment of the present invention. System 100 includes an image database of unprocessed images (or raw images), raw image database 102. Raw image database 102 is coupled to a processing pipeline server 110, which is further coupled to a blurred image database 120. Processing pipeline server 110 includes an object detector module 104, a false positive detector module 130, and an image blurring module 106.

In general, system 100 operates as follows. Processing pipeline server 110 receives a photographic image from raw image database 102. Object detector module 104 scans for regions of the photographic image that include objects of a particular type, like faces or license plates. Object detector module 104 sends the detected regions to false positive detector module 130. False positive detector module 130 may determine a set of features relating to each region detected and may evaluate the set of features to determine whether the region is a false positive. If the region is not a false positive, image blurring module 106 may blur the region of the image. False positive detector module 130 and image blurring module 106 may repeatedly evaluate and blur each region identified by object detector module 104. Processing pipeline server 110 then stores the blurred image in blurred image database 120. Blurred image database 120 may be accessible to users of the web, for example through a web server via one or more networks (not shown). In this way, identifying information of individuals in the photographic images may be obscured in the images that are ultimately available to end users. Thus, the privacy of the individuals is protected. Each of the components of system 100 is described generally below and in more detail with respect to FIGS. 2 and 3.

Raw image database 102 includes unprocessed photographic images. The photographic images can include, but are not limited to, portions of panoramic images, such as street level panoramas. The street-level panoramas may be collected from a moving vehicle using a custom camera rosette system mounted on a vehicle. The camera rosette may include nine 5-megapixel cameras, with eight of the cameras aimed roughly parallel to the ground in a radial configuration and one fisheye lens pointed upwards. The cameras may be synchronized to capture images that can be stitched together into a panorama. In one example, these images can be high-resolution image stitched together to form a panorama having a high-resolution too. The set of images that can be stitched together into a panorama may be referred to as a panorama set. In an embodiment, the images captured by the upward facing camera may be unlikely to capture identifiable faces or license plates. For that reason, images or portions of panoramas taken from that camera may not be blurred by processing pipeline server 110.

Processing pipeline server 110 receives an image from raw image database 102. In an example, processing pipeline server 110 may retrieve the image, for example, using an SQL select statement. Alternatively, raw image database 102 may push the image to processing pipeline server 110 to reduce processing work.

When an image is received by processing pipeline server 110, object detector module 104 detects regions of the photographic image that include objects of a particular type, such as faces or license plates. To detect the regions, object detector module 104 may analyze the content of the photographic image. In one embodiment of the invention, the sensitivity of object detector module 104 is adjusted for high recall, perhaps at the expense of precision. As a result, the likelihood that objects detector module 104 misses an object is low, but the likelihood that the regions include false positives may increase. As described in more detail below, object detector module 104 may include two detectors: one configured for high-recall, low-precision, and another configured for a balance between recall and precision.

Object detector module 104 may use a sliding window algorithm to detect objects. For example, object detector module 104 may use a standard sliding-window approach. Object detector module 104 may use a linear combination of heterogeneous set of feature detectors such as Gabor wavelets. The feature detectors may vary in complexity and required computing resources. When all scales are processed, the remaining windows may be filtered and merged according to their score and the number of overlapping boxes. This example is merely illustrative. Other object detection techniques may be used as would be recognized by a person of skill in the art given this description.

Object detector module 104 may include three separate detectors each with a sliding window algorithm configured to detect objects with different profile angles (pan or yaw) of, for example, 0-30, 30-60, and 60-90 degrees.

Object detector module 104 may also include a landmarker, which pinpoints facial feature locations within a region. Features extracted at those locations may be used to obtain a refined score that indicates the probability of a face being present.

As mentioned earlier, object detector module 104 may have a high recall rate. To attain the high recall rate, object detector module 104 may, for example, be trained with a learning algorithm. Further, object detector module 104 may have an increased contrast sensitivity to catch lower-contrast faces. Increased contrast sensitivity may help, for example, detect faces that are behind glass. Also, object detector module 104's training set (e.g., the images used to training its machine learning algorithm) may include faces from low-resolution street-level imagery, e.g. about 200 low resolution faces.

Once object detector module 104 determines the regions, object detector module 104 passes each region to false positive detector module 130. In an alternative embodiment, the regions may be stored is a database, and false positive detector module 130 may read the regions from the database. False positive detector module 130 determines whether each region detected by the object detector module is a false positive. To determine whether a region is a false positive, false positive detector module 130 may use information about the context in which the photographic image was taken. For example, the context information may include information indicating which camera in the camera rosette took the image, such as an index of the camera or information about vehicles detected in the image.

In an embodiment, to determine whether a region is a false positive, false positive detector module 130 may include several components: a simple feature generator module 132, composite feature generator module 136, simple false positive detector module 134, and composite false positive detector module 138. Simple feature generator module 132 and composite feature generator module 136 may generate the inputs for simple false positive detector module 134 and composite false positive detector module 138. Using the inputs, both composite false positive detector module 138 and simple false positive detector module 134 may be configured to determine a score that corresponds to a likelihood that the region does not include an object of a particular type, such as a face or license plate. However, composite false positive detector module 138 may require more computing resources, such as processor cycles and memory, and may use more inputs than simple false positive detector module 134. For this reason, composite false positive detector module 138 may be more accurate than simple false positive detector module 134.

In general, false positive detector module 130 may operate as follows. Simple feature generator module 132 may generate a feature vector. The feature vector may include one or more of the following:

(a) information describing the shape of the region generated by the object detector module (e.g., the left, right, bottom and top edges of the region, measured in pixels relative to the upper-left corner of the image, the ratio of the height to the bottom edge of the box, the area of the box in pixels, or the height and width of the box measured in pixels);

(b) information describing the appearance of the object in the region generated by the object detector module (e.g., the pose angle of a face, such as frontal, 30 degrees profile and 60 degrees profile, or the orientation of a license plate such as frontal or slanted);

(c) information indicating which camera in the camera rosette took the image (e.g., an index corresponding to the camera); and (d) a score determined by object detector module 104 (e.g., a score that corresponds to a confidence that the region includes an object of the particular type, a score of a landmarking stage of object detector module 104 that determines the likely positions of the eyes, nose, and mouth of the face within the box).

As mentioned at (a), the feature vector can include a ratio of the height to the bottom edge of the box. The ratio of the box height to box bottom may capture whether the real-world, three-dimensional size of the object indicated by a region is reasonable, given the examples seen in the training set. The ratio and the three-dimensional may relate to each other according to the equation:

$$\frac{\hat{v}_1}{\hat{v}_1 - \hat{v}_2} = \frac{y_c}{y},$$

where $v_1$ is the bottom edge of the object, $v_2$ is the top edge of the object, $\xi_1$-$v_2$ is a height of the object, $y_c$ is the height of the camera, and y is the height of the plane of the bottom edge of the object. In an embodiment, the camera may be affixed to a vehicle at a constant height. Further, in the case where faces are detected, y may be estimated based on an average human height in a training set. Similarly, y may be estimated based on an average height of a license plate. In this embodiment, $y_c/y$ may simply be calculated as:

$$\frac{\hat{v}_1}{\hat{v}_1 - \hat{v}_2},$$

perhaps with a coefficient offset.

Thus, the ratio of the height to the bottom edge of the box corresponds to the three-dimensional structure of the scene. Using the ratio in the feature vector adds knowledge of the scene.

Based on the feature vector, simple false positive detector module 134 may determine a score that corresponds to a likelihood that the region does not include an object of a particular type, such as a face or license plate. If the score is below a threshold, image blurring module 106 does not blur the region and the processing for that region ends. In this way, the region is identified as including a face using only the lesser computing power required of simple false positive detector module 134. Simple false positive detector module 134 rejects many of the false positives without performing more resource-intensive computing operations, for example operations that involve the pixels of the box, such as calculating color statistics or using a color histogram model or convolutional neural network.

If the score exceeds the threshold, then composite feature generator module 136 determines another feature vector. This second feature vector may include all the element of the simple feature vector in (a)-(d) above, plus one or more of the following:

(e) information describing an overlap between the region and other regions in the photographic image detected by the object detector module;

(f) a face color probability determined using a histogram model trained on human labeled faces;

(g) an aggregate color statistic determined based on the color hue, saturation, and value within the region;

(h) a value determined using a third artificial neural network configured to determine a likelihood that the region includes an object of the particular type based on a grayscale version of the region of the image; and (i) data from a second object detector module that is not trained for high-recall, (e.g., a score that corresponds to a confidence that the region includes an object of the particular type or a score of a landmarking stage of second object detector module that determines the likely positions of the eyes, nose, and mouth of the face within the box).

As mentioned at (f), the second feature vector may include a face color probability determined using a histogram model. An example of determining a face color histogram is described in M.J. Jones and J.M. Rehg., "Statistical color models with application to skin detection," IEEE Conference of computer vision and pattern recognition, pages 274-280, 1999. The histogram model may be developed using a large number (e.g. about 100,000) of high resolution images. The images may be marked for non-skin pixels. Using the pixels, a histogram may be generated. The histogram model may be smoothed out using, for example, expectation maximization. The histogram model may further be normalized for changes in illumination and weather condition as described in Terrillon et al. "Comparative performance of different skin chrominance models and chrominance spaces for the automatic detection of human faces in color images." In Proc. IEEE Automatic face and gesture recognition, 2000.

In an example, the color histogram may be built a 128-by-128-bin color histogram in hue-saturation space from the pixels of primary detection regions that overlap at least 10% with a ground-truth face region. To differentiate between face pixels and non-face pixels, color histogram may also include pixels from detection regions that were not labeled as face.

Using the histogram model, the likelihood that a given pixel is skin (P(face I color)) can be determined. Applying the histogram model to each pixel in a region, the second feature vector may include the average probability of skin per pixel. A classifier may classify a pixel as skin if the histogram model says that it is more likely skin than not skin. The second feature vector may also include the percentage of pixels classified as skin.

As mentioned at (h), the second feature vector may include a value determined using a artificial neural network. The artificial neural network may be a convolutional neural net that uses local receptive fields and shared weights. The convolutional neural net may have a deep architecture that includes two convolutional layers and two sub-sampling layers. The convolutional neural net may be trained using a constructive layer addition that generally trains one layer at a time. A grayscale version of the region of the image may be inputted into the convolutional neural net to yield a score included in the second feature vector.

Based on this second feature vector, composite false positive detector module 138 may determine a score that corresponds to a likelihood that the region includes an object of a particular type. If the score is below a threshold, image blurring module 106 does not blur the region. Otherwise, image blurring module 106 blurs the region.

In an alternative embodiment, false positive detector module 130 may only have composite feature generator module 136 and composite false positive detector module 138. In that embodiment composite feature generator module 136 may generate all the feature inputs needed by composite false positive detector module 138. Composite false positive detector module 138 may determine a score based on the features. If the score exceeds a threshold, then composite false positive detector module 138 may determine that the region includes an object of the particular type. This embodiment may have greater accuracy while using additional computing resources.

Both simple false positive detector module 134 and composite false positive detector module 138 may include neural networks. In an embodiment, simple false positive detector module 134 may include a fully-connected neural network with 19 input nodes, two output nodes, and two layers of hidden nodes. In contrast, composite false positive detector module 138 may include a fully-connected neural network with 58 nodes: 24 input nodes, two output nodes, and two hidden layers of 16 nodes each. For both, the final score from the neural network may be read from the second of the two output nodes. The use of neural networks is merely illustrative. Other algorithms, such as machine learning algorithms like a support vector machine or a Bayes network, may be used as would be recognized by a person skilled in the art given this description.

Simple false positive detector module 134 and composite false positive detector module 138 may be trained. To build the training set, object detector module 104 may identify regions, and a human may manually label the regions that include the objects of a particular type, e.g. faces or license plates. Each region in the training set may be applied to simple feature generator module 132 and composite feature generator module 136 to determine feature vectors as described above.

Simple false positive detector module 134 and composite false positive detector module 138 may be trained using backpropagation with a stochastic gradient descent on the cross entropy. To improve accuracy for large image regions, the cross entropy function may incorporate the area of the region. To prevent overtraining, weight decay may be used for regularization.

Image blurring module 106 may implement several blurring algorithms as would be known to a person skilled in the art given this description. In an embodiment, the blurring algorithm may be irreversible to protect privacy, but may not be distracting to a user. Examples of blurring algorithms are described in U.S. patent application Ser. No. 12/078,464, incorporated herein by reference.

Each of object detector module 104, false positive detector module 130, simple false positive detector module 134, composite false positive detector module 138, composite feature generator module 136 and simple feature generator module 132 may be implemented in hardware, software, firmware or any combination thereof.

Processing pipeline server 110 (and its component modules 132-138) may be implemented on any type of computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

Figure 2:
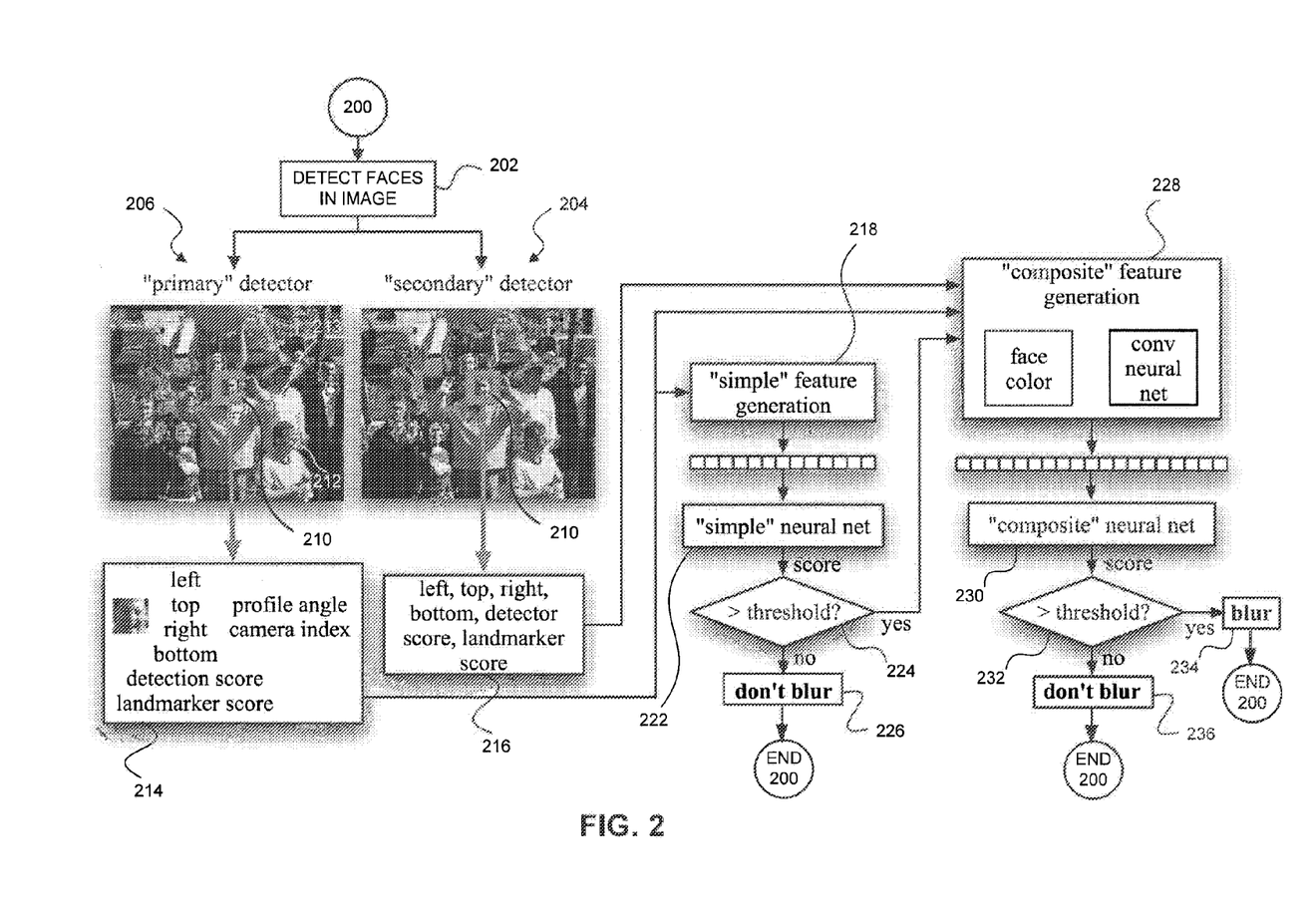
FIG. 2 is a flowchart illustrating a method for detecting and blurring faces in images, which may be used in operation of the system in FIG. 1.

FIG. 2 is a flowchart illustrating a method 200 for detecting and blurring faces in images, which may be used in operation of system 100. Method 200 represents only one illustrative embodiment incorporating both a simple neural network and a composite neural network. As mentioned earlier, in other embodiments, the initial screening with a simple neural network may be foregone, and only a composite neural network may be used.

Method 200 begins by detecting regions in an image that includes faces at step 202. As mentioned earlier, two face detectors may be used: a primary detector configured for high recall, perhaps at the expense of precision, and a secondary detector configured for to have a lesser recall with a higher precision. The primary detector detects regions illustrated in a box 206, and the secondary detector detects regions illustrated in a box 204. As the primary detector has a higher recall rate, box 206 shows more regions than box 204. For example, box 206 includes a region 212 that includes a face and is not detected by the secondary detector. In another example, box 206 includes a false positive region 213 that is not detected by the secondary detector. However, in the example illustrated, both the primary and secondary detectors detect a region 210.

Region 210 has attributes 214 determined by the primary detector and attributes 216 determined by the secondary detector. Attributes 216 include the left, top, right, and bottom sides of the region, the detector score, and the landmarker score (described above). In addition the parameters of attributes 216, attributes 214 further includes a profile angle of the face in region 210 and an index of the camera that took the image in a camera rosette.

At step 218, attributes 214 are used to generate the simple feature vector as described above. At step 222, the simple feature vector is fed into a simple neural network. Based on the simple neural network, a score is determined If the score is below a threshold at step 224, then the face is not blurred at step 226. Otherwise, the composite feature generation and neural network are executed at steps 228-236. In this way, the simple neural network filters out some of the regions without having to use the more computationally expensive composite feature generation and neural network. Optionally, steps 218-226 may be foregone entirely and the composite feature generation and neural network may be executed for every region.

The composite feature generation occurs at step 228. To generate a composite feature vector, a face color histogram model and convolutional neural network may be used as described above. The composite feature vector is inputted into a composite neural network as described above to determine a score (step 230). If the score is below a threshold at step 232, then the face is not blurred at step 236. Otherwise the face is blurred at step 234.

Figure 3:
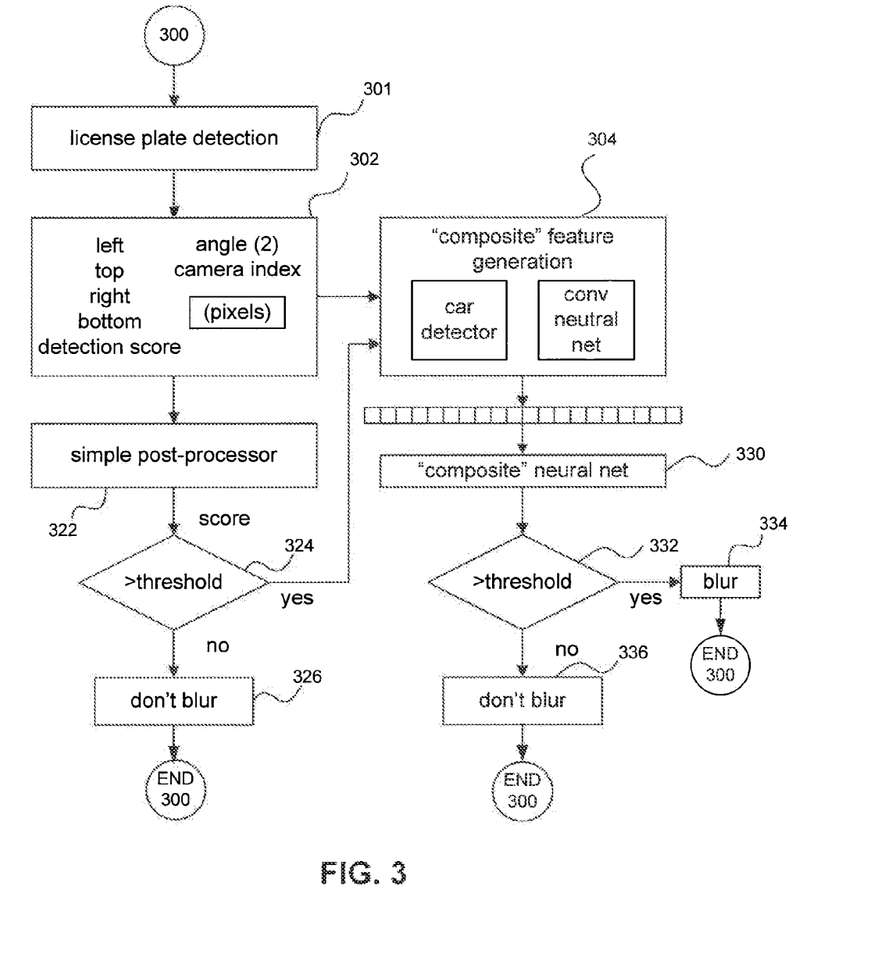
FIG. 3 is a flowchart illustrating a method for detecting and blurring license plates in images, which may be used in operation of the system in FIG. 1.

FIG. 3 is a flowchart illustrating a method 300 for detecting and blurring license plates in images, which may be used in operation of the system 100. Again, method 300 illustrates use of both a simple neural network and a composite neural network. In an alternative embodiment, only the composite neural network may be used.

Method 300 begins by detecting license plates at a step 301. In contrast to the two face detectors used above with respect to method 200, a single license plate detector may be used. The license plate detector generates attributes 302 describing each region. Attributes 302 may include the left, top, right, and bottom sides of the region, the detector score, whether the license plate is slanted or directly facing the camera, and an index of the camera on the camera rosette that took the photo.

At step 322, a simple feature vector may be generated and the simple feature vector may be inputted into a simple neural network as described above. The simple neural network determines a score. If the score is below a threshold at step 324, then the region is not blurred at step 326. Otherwise, operation continues to composite feature generation at step 304.

At step 304, a composite feature vector is determined In addition to the features (a) through (i) above, the feature vector may also includes information from a car detector for the image. This information provides context for the neural network. The car detector may use a variety of features, including Haar features computed over pixel intensity, Harris corner response, and gradient responses, and full-box gradient and intensity histograms. The training data for the car detector may be generated automatically by expanding a region around a detected license plate proportionally. In operation of the feature generator, the proportions for training are again used to identify a car region that corresponds to a license plate region. Using the identified car regions, two features may be added to the feature vector. The first feature may be the overlap (e.g. intersection over union) between the license plate region and the car region. The second feature may be a score of the car region generated by the car detector to indicate a level of confidence that the car region includes a vehicle.

The feature vector is inputted into a composite neural network at step 330. The composite neural network determines a score. If the score is below a threshold at step 332, the license plate region is not blurred in step 336; otherwise the license plate region is blurred at step 334.

Figure 4:
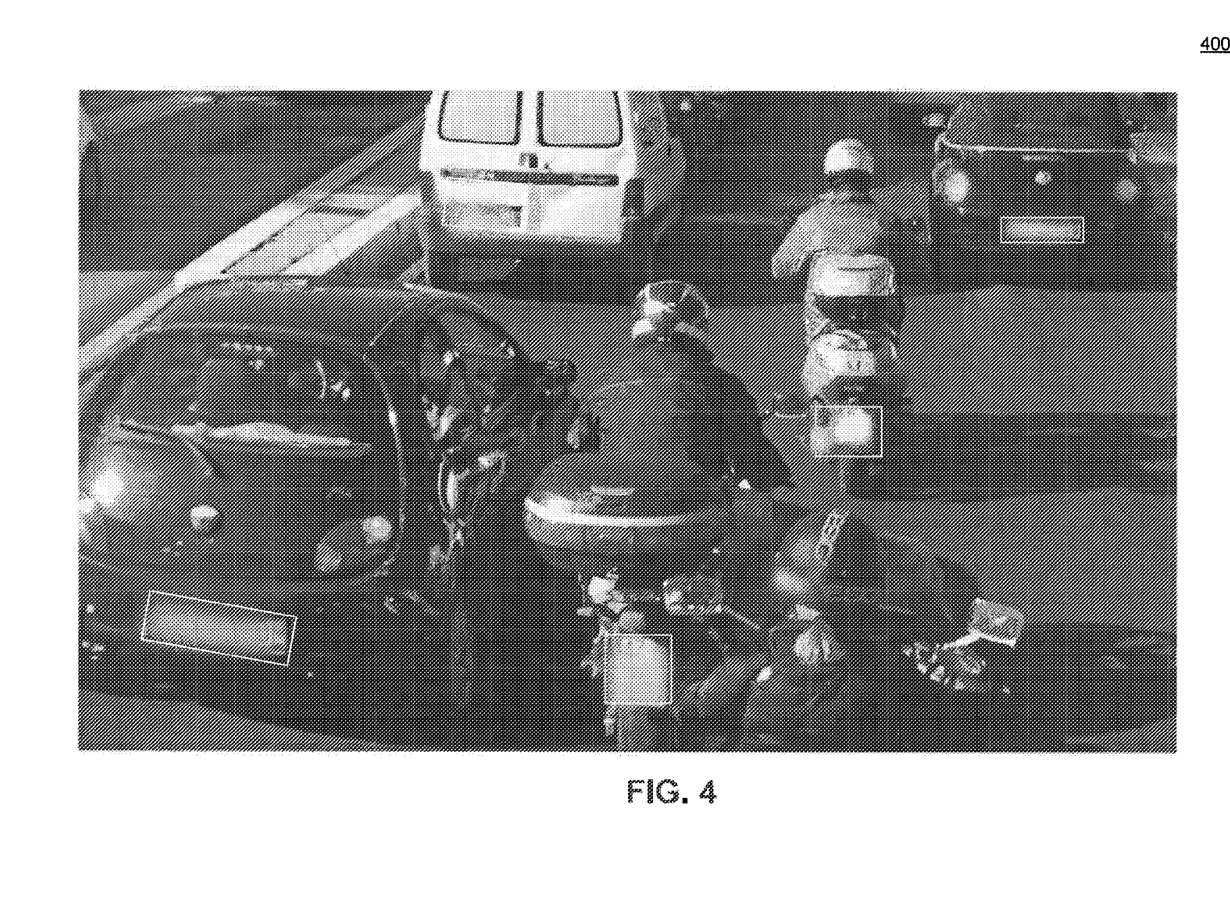
FIG. 4 is a diagram illustrating an example of detecting and blurring license plates in images.

FIG. 4 is a diagram 400 illustrating an example of detecting and blurring license plates in images. Diagram 400 includes an image that includes license plates of varying size. As indicated by the boxes in diagram 400, license plates have been detected. Further, the license plates have been blurred out.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The invention claimed is:

1. A method for detecting regions in an image, the method comprising:
   detecting, by one or more computing devices, a set of regions of the image that include features that appear to correspond to objects of a particular type; and
   identifying, by the one or more computing devices, a given region of the set of regions as not including features that correspond to objects of the particular type based on at least information describing a ratio including a size of the given region and a dimension of a feature included within the given region, wherein the information describing the ratio includes a dimension corresponding to a height of a camera that captured the image.

2. The method of claim 1, wherein the dimension includes a bottom edge of an object corresponding to the feature included in the given region.

3. The method of claim 1, wherein the dimension includes a height of an object corresponding to the feature included in the given region.

4. The method of claim 1, wherein the dimension includes a height of a plane of a bottom edge of an object corresponding to the feature included in the given region.

5. The method of claim 4, wherein the objects of the particular type are faces of humans and the height of the plane of the bottom edge of the object is estimated based on an average human height value.

6. The method of claim 4, wherein the objects of the particular type are license plates of vehicles and the height of the plane of the bottom edge of the object is estimated based on an average height of a license plate.

7. A system for detecting regions in an image, the system comprising:
   one or more computing devices configured to:
   detect a set of regions of the image that include features that appear to correspond to objects of a particular type; and
   identify a given region of the set of regions as not including features that correspond to objects of the particular type based on at least information describing a ratio including a size of the given region and a dimension of a feature included within the given region, wherein the information describing the ratio includes a dimension corresponding to a height of a camera that captured the image.

8. The system of claim 7, wherein the dimension includes a bottom edge of an object corresponding to the feature included in the given region.

9. The system of claim 7, wherein the dimension includes a height of an object corresponding to the feature included in the given region.

10. The system of claim 7, wherein the dimension includes a height of a plane of a bottom edge of an object corresponding to the feature included in the given region.

11. The system of claim 10, wherein the objects of the particular type are faces of humans and the height of the plane of the bottom edge of the object is estimated based on an average human height value.

12. The system of claim 10, wherein the objects of the particular type are license plates of vehicles and the height of the plane of the bottom edge of the object is estimated based on an average height of a license plate.

13. A non-transitory, tangible computer-readable storage medium on which computer readable instructions of a program are stored, the instructions, when executed by a processor, cause the processor to perform a method for detecting regions in an image, the system comprising:
   one or more computing devices configured to:
   detecting a set of regions of the image that include features that appear to correspond to objects of a particular type; and
   identifying a given region of the set of regions as not including features that correspond to objects of the particular type based on at least information describing a ratio including a size of the given region and a dimension of a feature included within the given region, wherein the objects of the particular type are license plates of vehicles and the height of the plane of the bottom edge of the object is estimated based on an average height of a license plate.

14. The medium of claim 13, wherein the dimension includes a height of an object corresponding to the feature included in the given region.

15. The medium of claim 13, wherein the dimension includes a height of a camera that captured the image.

16. The medium of claim 13, wherein the dimension includes a height of a plane of a bottom edge of an object corresponding to the feature included in the given region.

17. The medium of claim 16, wherein the objects of the particular type are faces of humans and the height of the plane of the bottom edge of the object is estimated based on an average human height value.

* * * * *